(12) United States Patent
Schumacher et al.

(10) Patent No.: US 8,535,633 B2
(45) Date of Patent: Sep. 17, 2013

(54) PROCESS FOR THE PRODUCTION OF DOPED METAL OXIDE PARTICLES

(75) Inventors: Kai Schumacher, Hofheim (DE); Rainer Golchert, Dieburg (DE); Helmut Roth, Mainaschaff (DE); Harald Alff, Kahl (DE); Matthias Rochnia, Ortenberg-Bleichenbach (DE)

(73) Assignee: Evonik Degussa GmbH, Essen (DE)

( * ) Notice: Subject to any disclaimer, the term of this patent is extended or adjusted under 35 U.S.C. 154(b) by 1028 days.

(21) Appl. No.: 12/091,767

(22) PCT Filed: Oct. 10, 2006

(86) PCT No.: PCT/EP2006/067232
§ 371 (c)(1), (2), (4) Date: Apr. 28, 2008

(87) PCT Pub. No.: WO2007/054412
PCT Pub. Date: May 18, 2007

(65) Prior Publication Data
US 2008/0311291 A1    Dec. 18, 2008

(30) Foreign Application Priority Data
Nov. 12, 2005 (EP) .................................. 05024753

(51) Int. Cl.
*C01B 13/00* (2006.01)

(52) U.S. Cl.
USPC ........... 423/275; 423/263; 423/325; 423/278; 423/594.17; 423/606; 423/608; 423/618; 423/625; 423/622; 423/274

(58) Field of Classification Search
USPC ........................................................ 423/274
See application file for complete search history.

(56) References Cited

U.S. PATENT DOCUMENTS

| | | | |
|---|---|---|---|
| 5,728,205 A | 3/1998 | Allen et al. | |
| 2003/0022081 A1* | 1/2003 | Inoue et al. | 430/105 |
| 2003/0051635 A1 | 3/2003 | Sankara Subramanian et al. | |

FOREIGN PATENT DOCUMENTS

| | | |
|---|---|---|
| EP | 0 769 534 | 4/1997 |
| JP | 2-307806 | 12/1990 |
| JP | 9-268014 | 10/1997 |
| JP | 2003-1117 | 1/2003 |
| WO | 96 36441 | 11/1996 |
| WO | 2004 056927 | 7/2004 |

OTHER PUBLICATIONS

Li Chunzhong, et al. "Process Study of $TiO_2$ Coating on $Al_2O_3$ Particles By Chemical Vapor Deposition Technology" (Abstract only), China Academic Journal Electronic Publishing House, vol. 46, No. 2, 2009, p. 199.

Office Action issued Aug. 10, 2011 in Japan Application No. 2008-537041 (English Translation).

* cited by examiner

*Primary Examiner* — Steven Bos
(74) *Attorney, Agent, or Firm* — Oblon, Spivak, McClelland, Maier & Neustadt, L.L.P.

(57) ABSTRACT

Process for the production of doped metal oxide particles, wherein the doping component is present on the surface in the form of domains, wherein in a first reaction zone, an oxidizable and/or —hydrolysable metal compound as dopant together with an atomization gas is atomized into a flow of metal oxide particles in a carrier gas, wherein the mass flow of the metal oxide particles und —the mass flow of the dopant are selected such that the doped metal oxide particles contain 10 ppm to 10 wt. % of the doping component, where the quantity of dopant to be introduced is calculated as the corresponding oxide, and wherein the temperature in the first reaction zone is —selected such that it is below the boiling temperature of the dopant under the prevailing reaction conditions, and then, in a second reaction zone, the flow from the first —reaction zone and optionally at least as much oxygen and/or steam are —introduced that the quantity of oxygen and/or steam at least suffices completely to convert the dopant, wherein the temperature is from 300 to 2000° C., —preferably 500 to 1000° C., and the reaction mixture is then cooled or allowed to cool and the doped metal oxide particles are separated from the gaseous substances.

18 Claims, 1 Drawing Sheet

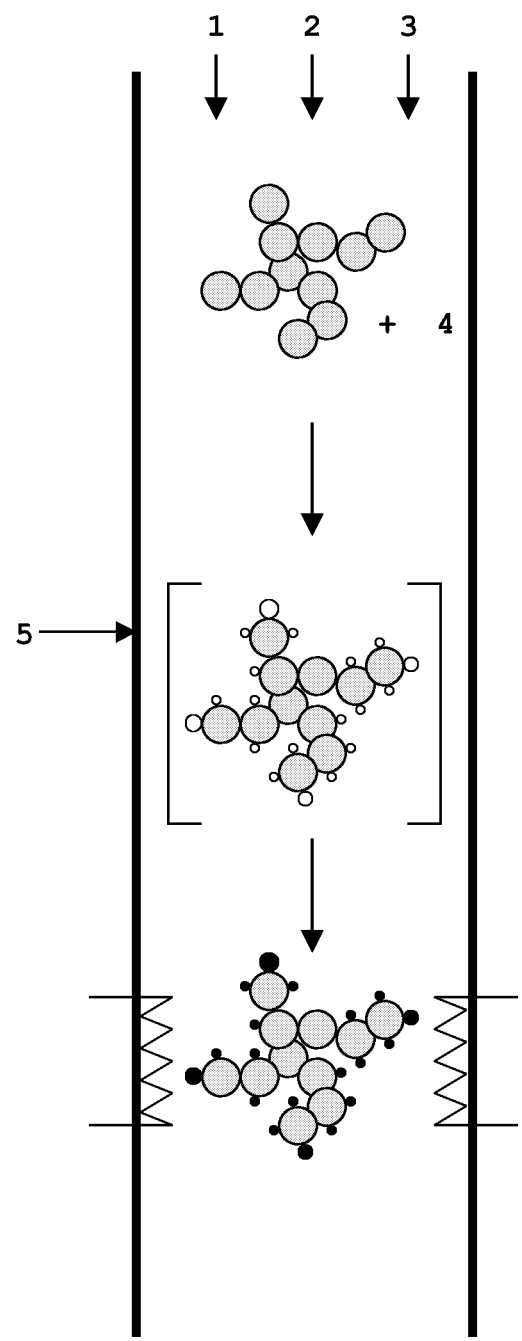

PROCESS FOR THE PRODUCTION OF DOPED METAL OXIDE PARTICLES

CROSS-REFERENCE TO RELATED APPLICATIONS

The present application is a 35 U.S.C. §371 National Stage patent application of International patent application PCT/EP06/067232, filed on Oct. 10, 2006, which claims priority to European patent application EP 05024753, filed on Nov. 12, 2005.

The invention relates to a process for the production of doped metal oxide particles, the doped metal oxide particles themselves, and the use thereof.

The current method for the doping of a surface by impregnation with a solution containing the dopant is as a rule particularly unsuitable for the doping of pyrogenically produced metal oxides. As a rule, the properties of pyrogenically produced metal oxides change on contact with a liquid medium. Thus for example a metal oxide powder can become markedly more coarse and the rheological properties can change.

In EP-A-850876, a process for the production of doped metal oxides is disclosed. In this, an aerosol containing the dopant is metered into a flame such as is known from the production of pyrogenic metal oxides by flame hydrolysis or flame oxidation. The doped metal oxides are characterized in that the doping component is present finely divided and homogenously in the metal oxide. This distribution of the doping component is desirable for many applications. On the other hand, there are in particular catalytic applications wherein the doping component should preferably be present on the surface. Such doped metal oxides cannot be produced in accordance with EP-A-850876.

In WO96/36441, a process for the production of coated titanium dioxide particles is disclosed, wherein thermally decomposable, volatile metal compounds are sprayed into a reactor below a zone wherein titanium dioxide particles are formed by reaction of titanium tetrachloride with oxygen. In this, the temperature at the spraying point is still high enough for the metal compounds to pass into the gaseous phase and be converted into the corresponding oxides on the surface of the titanium dioxide particles or be first oxidized and then deposited on the surface of the titanium dioxide particles. A disadvantage with this process is the necessary restriction to volatile metal compounds.

Thus existed the problem of providing a process which enables the production of metal oxides doped exclusively on the surface, without having the disadvantages of the state of the technology.

DEFINITIONS

In the context of the present invention, the following definitions apply:

Doped metal oxide particles should be understood to mean metal oxide particles or metalloid oxide particles which bear one or several doping components on the surface. Here the doping component forms domains on the surface, whose diameter at the lower limit encompasses a few molecules of the doping component. Domains should be understood to mean spatially mutually separate zones of the doping component. The upper limit of the diameter of the doping component is dependent on the BET surface area and the accessibility of the undoped metal oxide particles. The larger the diameter of an undoped metal oxide particle, the greater is its surface area. Thus the diameter of the doping component can also be greater than with a metal oxide particle of smaller diameter.

The diameters of the domains are as a rule of differing magnitude. This is attributable to the fact that different droplet sizes are already present during the spraying of the metal compound. Further, several smaller domains can grow together into one larger one. With the use of aggregated metal oxide particles, it is also possible that individual primary particles of the aggregate have no doping.

Metal oxide particles and the doping component can have the same metal component, but differ in their crystallographic properties. For example, the metal oxide particles can be present in crystalline form, and the doping component amorphous. The metal oxide particles and domains can also be present in different crystal modifications.

Dopant should be understood to mean the substance which is used in order to obtain the metal oxide particles containing the doping component. While the dopant is an oxidizable and/or hydrolysable metal compound, the doping component is as a rule an oxide of a metal. The dopant can be in liquid, dissolved or suspended form. It can if liquid be used directly, or else be dissolved in one or several solvents. Solid dopants are used in dissolved form or as a suspension in one or several solvents.

Metal oxide particles include particles of metal oxides or metal mixed oxides, which are present in the form of aggregated primary particles, to a very large extent aggregated primary particles or non-aggregated particles. The diameter of the particles here ranges from a few µm, as a rule 1 to 10 µm up to a few nanometres, as a rule 5 to 100 nm. The term metal oxide, as well as the actual metal oxides, also includes metalloid oxides, such as for example silicon dioxide and mixed oxides.

The expression "oxidizable and/or hydrolysable metal compound" should be understood to mean that the compound can be converted into the oxide by oxidation and/or hydrolysis. Depending on the reaction conditions, namely the steam and/or oxygen available, the different oxides or a mixture of oxides can be formed, for example $Fe_2O_3$ and/or $Fe_3O_4$.

Exceptions to this are noble metal compounds, which are entirely or mainly converted into elemental noble metal and are present as such on the metal oxide particle.

The expression "reaction zone" should be understood to mean a space separated off from the outside atmosphere. This can for example be a flow tube or a container.

The BET surface area is the specific surface area of the doped metal oxide particles determined as per DIN66131.

Pyrogenic metal oxide particles should be understood to mean those obtained by flame oxidation and/or flame hydrolysis. The metal oxide particles thus obtained are very largely pore-free and have free hydroxyl groups on the surface. As starting materials for pyrogenic processes, organic and inorganic substances can be used. Particularly suitable for example are the metal chlorides such as silicon tetrachloride, aluminium chloride, titanium tetrachloride and zirconium tetrachloride. Suitable organic compounds can for example be $Si(OR)_4$ with R=$CH_3$ or $CH_2CH_3$. The selection of the compounds is known to the skilled person in the pyrogenic oxides field.

Wet chemical processes should be understood to mean both precipitation processes and also sol-gel processes. On this, see for example C. J. Brinker and G. W. Scherer, Sol-Gel Science, Acad. Press, San Diego, 1990.

The object of the invention is a process for the production of doped metal oxide particles, wherein the doping component is present on the surface in the form of domains, wherein in a first reaction zone, an oxidizable and/or hydrolysable metal compound as dopant together with an atomization gas is atomized into a flow of metal oxide particles in a carrier gas, wherein the mass flow of the metal oxide particles und the mass flow of the dopant are selected such that the doped metal oxide particles contain 10 ppm to 10 wt. %, preferably 100 ppm to 3 wt. %, of the doping component, where the quantity of dopant to be introduced is calculated as the corresponding oxide, and wherein the temperature in the first reaction zone is selected such that it is below the boiling temperature of the dopant under the prevailing reaction conditions, and then, in a second reaction zone, the flow from the first reaction zone and optionally at least as much oxygen and/or steam are introduced that the quantity of oxygen and/or steam at least suffices completely to convert the dopant, wherein the temperature is from 300 to 2000° C., preferably 500 to 1000° C., and the reaction mixture is then cooled or allowed to cool and the doped metal oxide particles are separated from the gaseous substances.

As metal oxide particles, the oxides of aluminium, boron, cerium, germanium, niobium, silicon, tantalum, titanium, vanadium, tungsten, zinc, zirconium and/or mixed oxides thereof can preferably be used.

The oxides of aluminium, cerium, silicon, titanium, zinc, zirconium and/or mixed oxides thereof can particularly preferably be used as metal oxide particles.

In particular, metal oxide particles of pyrogenic origin, such as for example the oxides of aluminium, boron, cerium, germanium, niobium, silicon, tantalum, titanium, vanadium, tungsten, zinc, zirconium and/or mixed oxides thereof can be used.

The dopants used in the form of metal compounds can be both organic and also inorganic in nature. The choice thereof is only restricted to the extent that they are oxidizable and/or hydrolysable under the reaction conditions and that their boiling point is below the temperature in the reaction zones 1 and 2.

Suitable organic dopants can for example be selected from the group of the carboxylates, acetylacetonates, alkoxides, and metallocenes.

Suitable inorganic dopants include in particular chlorides, nitrates and/or sulphates.

The metal component of the dopant is not limited. In particular, the metal component can be Li, Na, K, Rb, Cs; Be, Mg, Ca, Sr, Ba; B, Al, Ga, In, Tl; Si, Ge, Sn, Pb; P, As, Sb, Bi; Cu, Ag, Au; Zn, Cd; Sc, Y, La; Ti, Zr, Hf; V, Nb, Ta; Cr, Mo, W; Mn, Tc, Re; Fe, Co, Ni, Ru, Rh, Pd, Os, Ir, Pt; La, Ce, Pr, Nd, Pm, Sm, Eu, Gd, Tb, Dy, Ho, Er, Tm, Yb or Lu.

Particularly preferably, the metal component is selected from the elements comprising K, Al, Si, P, Cu, Ag, Zn, Y, La, Ti, V, Mn, Fe, Co, Ru, Pt, Ce, Er and Yb.

Particularly preferred dopants are aluminium acetyl-acetonate, aluminium trichloride, aluminium iso-sec.-butylate, iron nitrate, iron sulphate, iron trichloride, potassium chloride, potassium tert-butylate, manganese carbonate, manganese dichloride, manganese dinitrate, manganese sulphate, silicon tetrachloride, titanium tetrachloride, zirconium acetylacetonate and zirconium tetrachloride.

According to the invention, the dopant can be introduced in liquid, dissolved or suspended form. Preferably, the dopant is dissolved in one or several suitable solvents. A preferred solvent is water, alone or in a mixture with an organic solvent including methanol, ethanol, n-propanol, iso-propanol, n-butanol, iso-sec-butanol, tert-butanol, formic acid, acetic acid, propionic acid, butyric acid, pentanoic acid, hexanoic acid, octanoic acid, 2-ethyl-hexanoic acid and/or petroleum ether. As a rule the content of organic solvent in the water/organic solvent mixture is not more than 50 wt. %. The boiling point of the solvent is lower than the boiling point of the dopant and lower than the conversion temperature of the dopant into the doping component.

The concentration of the dopant in the solution depends on its solubility and the concentration at which the metal compound can still be sprayed. Here, the temperature, pH value, nature of the solvent and pressure have to be taken into account. If the quantity of the doping component on the subsequently doped metal oxide particles is to be very small, for example 10 to 100 ppm, it can be advantageous to use a solution of as low a concentration as possible. As a rule, the concentration of the dopant is 0.01 to 20 wt. %, wherein a range from 0.1 to 5 wt. % can be preferred.

The solution containing the dopant can have any pH value, and can be adjusted to such a value with suitable pH regulators. Suitable pH regulators are those which under the reaction conditions of the process according to the invention do not result in lasting contamination of the product. For example, with the use of hydrochloric acid for pH regulation, this is very largely removed from the product by oxygen and/or steam. In some cases, further purification steps must be included after this.

The atomization can be effected by aerosol generators, single or multi-substance nozzles, or ultrasonic atomization, known to the skilled person. Particularly suitable are devices which create an aerosol with a mean droplet diameter of less than 100 μm, in particular 10 to 50 μm.

According to the invention, the carrier gas can be oxygen, steam, inert gases, carbon dioxide, carbon monoxide, chlorine, nitric acid, hydrochloric acid, noble gases or a mixture of the aforesaid compounds.

The temperature in the first reaction zone is selected such that it is below the boiling temperature of the dopant under the prevailing reaction conditions. In the case where oxygen and/or steam is present in the first reaction zone, care must be taken that the temperature in the first reaction zone is below the conversion temperature of the dopant into the corresponding oxide.

The process according to the invention can preferably be performed such that the mean residence time in the first reaction zone is 1 msec to 1 min.

Further, the process according to the invention can preferably be performed such that the mean residence time in the second reaction zone is 1 sec to 5 mins.

The process according to the invention can preferably be performed such that the dopant is introduced into a flow such as arises in the production of pyrogenic oxides by flame hydrolysis or flame oxidation, which as well as metal oxide powder still contains oxygen and/or steam.

As already described above, pyrogenic oxides include those which are obtained by flame oxidation and/or flame hydrolysis. The usual procedure here is that a metal compound, for example aluminium chloride, is converted to the corresponding metal oxide particles in the presence of oxygen and/or steam in a flame. The flame is as a rule obtained by reaction of a fuel gas, such as hydrogen or methane, with oxygen from the air. For this, oxygen can be used in excess. Accordingly, in the flow deriving from aluminium chloride, at least the aluminium oxide particles, steam and hydrochloric acid or chlorine are present. If oxygen is used in excess, the flow also contains oxygen. Optionally it can also contain nitrogen and/or carbon dioxide. The reaction of aluminium chloride to aluminium oxide is intended by way of example to illustrate a pyrogenic process. Of course, other metal compounds can also be used, which lead to other flows, whose composition is known to the skilled person.

The dopant is then atomised into this flow, the temperature of the flow being below the boiling temperature of the dopant, and below the reaction temperature for the conversion of the dopant into the corresponding oxide. The temperature of the flow can optionally be adjusted by cooling such that these conditions are fulfilled. The temperature in this region is normally about 200 to 700° C.

Next, a temperature of 300 to 2000° C., preferably 500 to 1000° C., is created by internal or external heating.

A possible reaction mechanism for the doping of the metal oxide particles provides that the metal oxide particles first become coated with the dopant with the formation of domains, and then in the presence of oxygen and/or steam the dopant on the metal oxide particle is converted into the corresponding oxide, or in the case where the dopant is a noble metal compound, into the noble metal. FIG. 1 shows diagrammatically by way of example the production of aggregated silicon dioxide particles doped with iron oxide according to this process. Silicon tetrachloride (1) is reacted in a flame formed by reaction of air (2) with hydrogen (3) with the formation of aggregated silicon dioxide particles and a gas mixture (4) consisting of steam, in some cases residual oxygen, nitrogen and hydro-chloric acid. The reaction products are then cooled and potassium chloride is added as a dopant, firstly with the formation of silicon dioxide particles coated with the dopant (shown as ○). By subsequent raising of the temperature, the dopant iron chloride is converted into the doping component iron oxide ($Fe_2O_3$) (shown as ●) with the formation of the silicon dioxide particles doped with iron oxide. Under the reaction conditions, hydrochloric acid adhering to the doped metal oxide particles is very largely removed.

A further object of the invention are doped metal oxide particles obtainable by the process according to the invention, wherein the doping component is exclusively located on the surface and the content of the doping component is from 10 ppm to 10 wt. %, preferably 100 ppm to 3 wt. %, based on the doped metal oxide particles.

The doped metal oxide particles can have a BET surface area of preferably 1 to 500 $m^2/g$ and particularly preferably of 20 to 400 $m^2/g$.

A further object of the invention is the use of the doped metal oxide particles as a catalyst, catalyst support, as a filler and for polishing.

The process according to the invention enables the production of doped metal oxide particles, wherein the metal oxide particles and the dopants are combinable almost without restriction.

The doped metal oxide particles obtainable by the process according to the invention are characterized in that the doping component is present exclusively on the surface of the metal oxide particles. Furthermore, the morphology of the metal oxide particles used changes not at all or only insignificantly. Morphology should be understood to mean for example the structure of undoped, aggregated metal oxide particles. As shown schematically in FIG. 1, this does not change during the doping process. In contrast to this, processes wherein the doping component is applied onto metal oxide particles in an aqueous process result in changes in the morphology of the metal oxide particles.

EXAMPLES

Example 1

1200 g/hr of a 1 weight percent solution of manganese acetylacetonate ($C_{10}H_{14}MnO_4$) in 90:10 vol.-% water/ethanol are atomised into a flow of 2 kg/hr AEROSIL®200 in 15 $Nm^3$/hr nitrogen at a temperature $T_{RZ1}$ of 240° C. After a mean residence time $t_{RZ1}$ of 25 msecs, the temperature of the mixture is raised to $T_{RZ2}$=700° C. After a mean residence time $t_{RZ2}$=2 mins, the doped metal oxide particles are separated in a downstream filter.

Examples 2 to 4 according to the invention are performed analogously to Example 1. AEROSIL®OX50 is used in Example 2, Sipernat®160 in Example 3 and a silicon-titanium mixed oxide (Si—Ti-MOX) in Example 4. The silicon-titanium mixed oxide is obtained according to the German patent application with the application number 102004024500.2 and the application date 18.05.2004: silicon tetrachloride (3.60 kg/hr) and titanium tetrachloride (3.00 kg/hr) are evaporated together in an evaporator at 160° C. The vapours are transferred into a mixing chamber with nitrogen. Separately from this, hydrogen (3.30 $Nm^3$/hr) and primary air (13.30 $Nm^3$/hr) are introduced into the mixing chamber. In a central tube, the reaction mixture is fed into a burner and ignited. Here, the flame burns in a water-cooled flame tube. In addition, secondary air (20 $Nm^3$/hr) and hydrogen (0.2 $Nm^3$/hr) and carbon dioxide (0.2 $Nm^3$/hr) are separately introduced into the reaction space. The silicon-titanium mixed oxide is separated in a downstream filter and then treated with steam in counterflow.

The properties of the particles used are shown in Table 1. All substances used and reaction conditions are shown in Table 2. The analytical data for the doped metal oxide particles are in Table 3.

Example 5

8.00 kg/hr of silicon tetrachloride are evaporated. The vapours are transferred into a mixing chamber with 3.3 $Nm^3$/hr air as carrier gas. Separately from this, 3.6 $Nm^3$/hr of core hydrogen and 10.0 $Nm^3$/hr of primary air are introduced into the mixing chamber. In a central tube, the reaction mixture is fed into a burner and ignited. Here, the flame burns in a water-cooled flame tube. In addition, 20 $Nm^3$/hr of secondary air are introduced into the reaction space. At a temperature $T_{RZ1}$ of 400° C., 210 g/hr of a 1.8 wt. % solution of iron-II chloride in water are sprayed into this flow of silicon dioxide particles, hydrochloric acid, air and nitrogen. After a mean residence time $t_{RZ1}$ of 12 msecs, the temperature of the mixture is raised to $T_{RZ2}$=690° C. After a mean residence time $t_{RZ2}$=45 secs, the doped metal oxide particles are separated in a downstream filter.

Examples 6 to 11 according to the invention are performed analogously to Example 5. In Example 9, aluminium chloride is evaporated instead of silicon tetrachloride. In Example 10, titanium tetrachloride is evaporated instead of silicon tetrachloride. All substances used and reaction conditions are shown in Table 4.

The analytical data for the doped metal oxide particles are shown in Table 5.

TABLE 1

Physical and chemical data for the powders used

|  |  | Sipernat® 160 | Aerosil® OX 50 | Aerosil® 200 | Si—Ti-MOX |
|---|---|---|---|---|---|
| Specific surface area (BET) | m$^2$/g | 165 | 50 ± 15 | 200 ± 25 | 100 |
| Mean size of primary particles | nm | 7 | 40 | 12 | n.d. |
| Loss on drying*) | wt. % | 3 | <1.5 | <1.5 | n.d. |
| Loss on ignition**) | wt. % | 3 | <1.0 | <1.0 | n.d. |
| pH value |  | 5.5$^§$$^)$ | 3.8-4.8$^&$$^)$ | 3.7-4.7$^&$$^)$ | 3.75$^&$$^)$ |
| SiO$_2$ content***) | wt. % | 99.4 | >99.8 | >99.8 | 49.9 |
| TiO$_2$ content***) | wt. % | — | — | — | 51.1 |

*)2 hrs at 105° C.;
**)2 hrs at 1000° C.;
***)based on ignited substance;
$^§$$^)$5 percent dispersion in water;
$^&$$^)$4 percent dispersion in water;

TABLE 2

Substances used and reaction conditions - I

| Ex. | Carrier gas type | qty. Nm$^3$/hr | Metal oxide type | qty. kg/hr | Dopant type | solvent | conc. wt. % | qty. g/hr | Res. time $t_{RZ1\&}$ msec | $t_{RZ2}$ min | Temperature $T_{RZ1}$ °C. | $T_{RZ2}$ °C. |
|---|---|---|---|---|---|---|---|---|---|---|---|---|
| 1 | air | 15 | AEROSIL®200 | 2 | C$_{10}$H$_{14}$MnO$_4$ | #) | 1 | 1200 | 25 | 2 | 240 | 700 |
| 2 | air | 25 | AEROSIL®OX50 | 1.4 | CuCl$_2$ | H$_2$O | 7.5 | 850 | 40 | 4 | 430 | 650 |
| 3 | air | 15 | Si—Ti-MOX | 2 | FeCl$_3$ | H$_2$O | 0.2 | 100 | 30 | 4 | 480 | 680 |
| 4 | N$_2$ | 30 | Sipernat®160 | 1.4 | Ce(NO$_3$)$_3$ | H$_2$O | 10 | 2500 | 45 | 4.5 | 410 | 720 |

)90:10 vol.-% H$_2$O/EtOH;
$_&$)RZ = reaction zone

TABLE 3

Doped metal oxide particles - I

| Ex. | BET m$^2$/g | Metal oxide type | quantity wt. % | Doping component type | quantity wt. % |
|---|---|---|---|---|---|
| 1 | 194 | SiO$_2$ | 99.8 | MnO$_2$ | 0.2 |
| 2 | 44 | SiO$_2$ | 97.2 | CuO | 2.6 |
| 3 | 101 | SiO$_2$/TiO$_2$ | 99.9 | Fe$_2$O$_3$ | 0.0045 |
| 4 | 162 | SiO$_2$ | 90.2 | CeO$_2$ | 9.3 |

TABLE 4

Substances used and reaction conditions - II

| Ex. | Hydrogen core Nm$^3$/hr | Hydrogen jacket Nm$^3$/hr | Air prim. Nm$^3$/hr | Air sec. Nm$^3$/hr | Metal oxide-precursor type | qty. kg/hr | Dopant$^§$$^)$ type | conc. wt. % | qty. g/hr | Res. time $t_{RZ1\&}$ msec | $t_{RZ2}$ sec | Temperature $T_{RZ1}$ °C. | $T_{RZ2}$ °C. |
|---|---|---|---|---|---|---|---|---|---|---|---|---|---|
| 5 | 3.6 | 0.50 | 8.1 | 20 | SiCl$_4$ | 8.00 | FeCl$_3$ | 1.8 | 210 | 12 | 45 | 400 | 690 |
| 6 | 0.8 | 0.12 | 2.1 | 10 | SiCl$_4$ | 2.00 | FeCl$_3$ | 10 | 400 | 25 | 30 | 270 | 820 |
| 7 | 2.3 | 0.30 | 6.9 | 20 | SiCl$_4$ | 4.44 | KCl | 3.0 | 191 | 12 | 24 | 320 | 500 |
| 8 | 2.3 | 0.30 | 12.3 | 20 | Si(OMe)$_4$ | 1.70 | AlCl$_3$ | 2.3 | 155 | 15 | 37 | 250 | 725 |
| 9 | 1.0 | 0.90 | 5.5 | 30 | AlCl$_3$ | 2.60 | Si(OEt)$_4$ | 3.5 | 250 | 35 | 47 | 150 | 450 |
| 10 | 2.2 | 0.70 | 14.8 | 17 | TiCl$_4$ AlCl$_3$ | 4.30 0.025 | CeCl$_3$ | 2.9 | 200 | 40 | 28 | 400 | 660 |
| 11 | 2.3 | 0.3 | 6 | 15 | SiCl$_4$ | 4.44 | CaCl$_2$ | 3.9 | 285 | 35 | 42 | 380 | 745 |

$^§$$^)$all as solution in water, except Si(OEt)$_4$ in 80:20 water/ethanol

TABLE 5

| Doped metal oxide particles - II | | | | | |
|---|---|---|---|---|---|
| | | Metal oxide | | Doping component | |
| Ex. | BET $m^2/g$ | type | quantity wt. % | type | quantity wt. % |
| 5 | 135 | $SiO_2$ | 99.9 | $Fe_2O_3$ | 0.04 |
| 6 | 124 | $SiO_2$ | 97.4 | $Fe_2O_3$ | 2.58 |
| 7 | 299 | $SiO_2$ | 99.8 | $K_2O$ | 0.14 |
| 8 | 202 | $SiO_2$ | 99.8 | $Al_2O_3$ | 0.18 |
| 9 | 151 | $Al_2O_3$ | 99.5 | $SiO_2$ | 0.4 |
| 10 | 75 | $TiO_2/Al_2O_3$ | 99.4/0.5 | $CeO_2$ | 0.2 |
| 11 | 176 | $SiO_2$ | 99.8 | CaO | 0.16 |

The invention claimed is:

1. A process, comprising:

atomizing, in a first reaction zone, a dopant that comprises at least one metal or metalloid chloride, nitrate, or sulphate where each metal or metalloid thereof is selected from the group consisting of lithium, sodium, potassium, rubidium, cesium, beryllium, magnesium, calcium, strontium, barium, boron, aluminium, gallium, indium, thallium, silicon, germanium, tin, lead, phosphorus, arsenic, bismuth, copper, silver, gold, zinc, cadmium, scandium, yttrium, lanthanum, zirconium, hafnium, vanadium, niobium, tantalum, chromium, molybdenum, tungsten, manganese, technetium, rhenium, iron, cobalt, nickel, ruthenium, rhodium, palladium, osmium, iridium, platinum, lanthanum, cerium, praseodymium, neodymium, promethium, samarium, europium, gadolinium, terbium, dysprosium, holmium, erbium, thulium, ytterbium, and lutetium, at least one metal compound selected from the group consisting of aluminium acetyl-acetonate, aluminium trichloride, aluminium iso-sec-butylate, iron nitrate, iron sulphate, iron trichloride, potassium chloride, potassium tert-butylate, manganese carbonate, manganese dichloride, manganese dinitrate, manganese sulphate, silicon tetrachloride, zirconium acetylacetonate, and zirconium tetrachloride, or a combination thereof, and an atomization gas into a flow of metal oxide particles of an oxide of at least one of aluminium, boron, cerium, germanium, niobium, silicon, tantalum, vanadium, tungsten, zinc, and zirconium in a carrier gas to obtain metal oxide particles having a dopant present on surfaces thereof, wherein the mass flow of the metal oxide particles and the mass flow of the dopant are selected such that the doped metal oxide particles comprise 10 ppm to 10 wt % of the dopant, where the quantity of dopant to be introduced is calculated as the corresponding oxide, and wherein the temperature in the first reaction zone is selected such that it is below the boiling temperature of the dopant under the prevailing reaction conditions and is below a reaction temperature of the conversion of the dopant into the corresponding oxide, introducing, into a second reaction zone, a flow from the first reaction zone and oxygen, steam, or both into a reaction mixture such that oxygen, steam, or both is present in an amount to convert the dopant into a doping component, wherein the temperature in the second reaction zone is from 300 to 2000° C., doping the metal oxide particles with the doping component to obtain doped metal oxide particles, cooling the doped metal oxide particles, and separating the doped metal oxide particles from the carrier gas to isolate the doped metal oxide particles, wherein the doping component is exclusively present on the surface of the doped metal oxide particles in the form of domains, and the content of the doping component is from 10 ppm to 10 wt %, based on the doped metal oxide particles.

2. The process according to claim 1, wherein the metal oxide particles are pyrogenic metal oxide particles.

3. The process according to claim 1, wherein each metal or metalloid of the dopant is in the form of an inorganic metal or metalloid salt.

4. The process according to claim 1, wherein the carrier gas comprises at least one member selected from the group consisting of oxygen, steam, inert gases, carbon dioxide, carbon monoxide, chlorine, nitric acid, hydrochloric acid, and a noble gas.

5. The process according to claim 1, wherein a mean residence time of the dopant and the atomization gas in the first reaction zone is 1 millisecond to 1 minute.

6. The process according to claim 1, wherein a mean residence time of the flow from the first reaction zone and at least one of oxygen and steam in the second reaction zone is 1 second to 5 minutes.

7. The process according to claim 1, further comprising flame hydrolyzing or flame oxidizing an oxide to obtain a pyrogenic oxide and introducing the dopant into a flow comprising metal oxide powder and steam obtained from said flame hydrolyzing or flame oxidizing.

8. The process according to claim 1, wherein said doped metal oxide particles have a BET surface area of 1 to 500 $m^2/g$.

9. The process according to claim 1, wherein the temperature in the second reaction zone is from 500 to 1000° C.

10. The process according to claim 1, wherein said doped metal oxide particles have a BET surface area of 20 to 400 $m^2/g$.

11. The process according to claim 1, wherein the metal oxide particles are particles of an oxide of at least one of aluminium, cerium, silicon, zinc, and zirconium.

12. The process according to claim 1, wherein the doping component does not include titanium.

13. The process according to claim 1, wherein the doping component comprises at least one metal or metalloid chloride, nitrate, or sulphate where each metal or metalloid thereof is selected from the group consisting of potassium, aluminium, silicon, phosphorus, copper, silver, zinc, yttrium, lanthanum, vanadium, manganese, iron, cobalt, ruthenium, platinum, cesium, erbium, and ytterbium.

14. The process according to claim 11, wherein said doped metal oxide particles have a BET surface area of 20 to 400 $m^2/g$.

15. The process according to claim 1, wherein the content of the doping component is from 100 ppm to 3 wt %, based on the doped metal oxide particles.

16. The process according to claim 1, wherein said atomization is carried out with an aerosol generator or a single or multi-substance nozzle.

17. The process according to claim 1, wherein the dopant in the first reaction zone is in form of an aerosol having a mean droplet diameter of less than 100 μm.

18. The process according to claim 1, wherein the dopant in the first reaction zone is in form of an aerosol having a mean droplet diameter of from 10 to 50 μm.

* * * * *